T. ELKINS.
Refrigerating Apparatus.

No. 221,222. Patented Nov. 4, 1879.

Witnesses: Charles Selkirk, Alex. Selkirk

Tho. Elkins, Inventor.

UNITED STATES PATENT OFFICE.

THOMAS ELKINS, OF ALBANY, NEW YORK.

IMPROVEMENT IN REFRIGERATING APPARATUS.

Specification forming part of Letters Patent No. 221,222, dated November 4, 1879; application filed July 15, 1879.

*To all whom it may concern:*

Be it known that I, THOMAS ELKINS, of the city and county of Albany and State of New York, have invented certain new and useful improvements in apparatus or devices for chilling or cooling articles liable to decay, or articles for food, or human corpses, of which the following is a specification.

This invention relates to apparatus for refrigerating food and other substances; and it consists in the combination, with a trough holding water or other refrigerating-fluid, of a box inclosing a cooling-chamber, and consisting of detachable sections lined externally with a bibulous envelope, which extends down into said trough.

It also consists in the combination, with the devices above stated, of an external shell, a perforated bottom, and a grating resting on said bottom within the space inclosed by said trough and sectional box, substantially as hereinafter more fully set forth.

Figure 1:
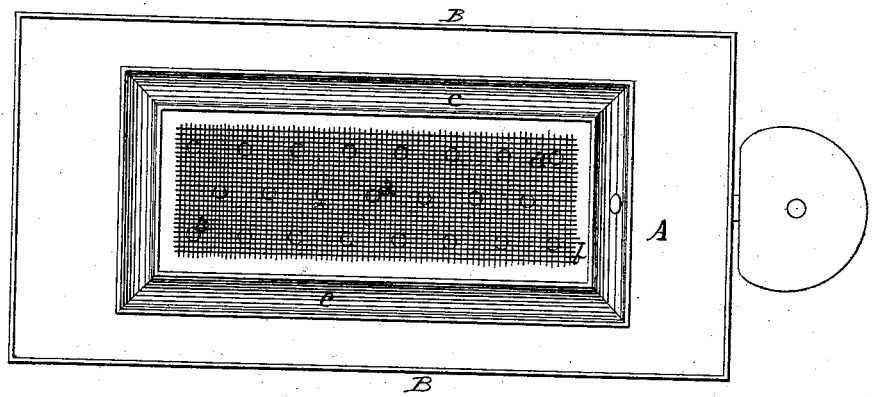
Figure 2:
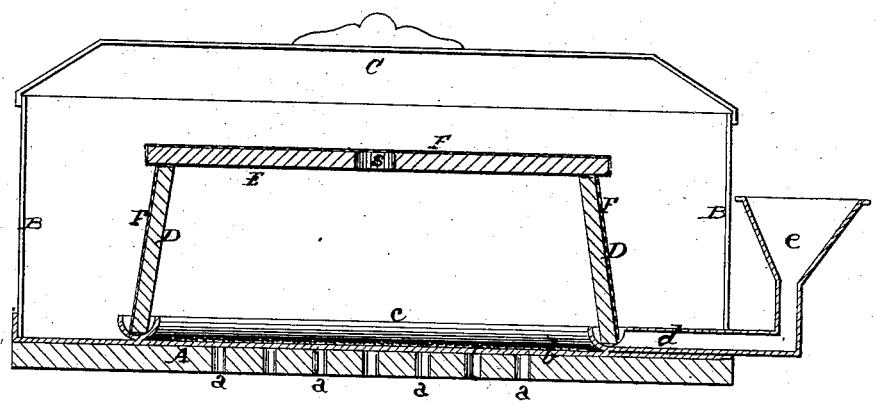
Figure 3:
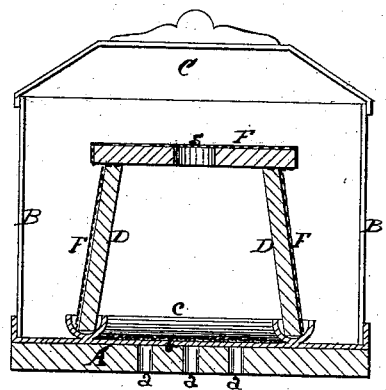

In the accompanying drawings, Figure 1 represents a plan view of the bottom of my apparatus. Fig. 2 is a sectional elevation of the apparatus, and Fig. 3 is a cross-sectional view of the same.

In the drawings, A represents the bottom of the apparatus, which is preferably made of metal or wood covered with sheet metal. B is the case, also made of sheet metal or wood and sheet metal combined. C is the cover of the case. This case, together with the bottom and cover, incloses the apparatus, and prevents the atmosphere of the room affecting the operations of the apparatus inclosed.

The bottom A is made with a grated or perforated section, having a form and extension corresponding with the form and extension of the chilling-box D at its base. This perforated section I prefer to form with vertical perforations $a\ a$ and a wire netting or grating, $b$, as shown.

Bounding all the sides and ends of the said perforated section is a trough or canal, $c$, for holding water, and also for receiving the base border edge of the chilling-box D. $d$ is a conduit for conveying water from funnel $e$ to the trough $c$. D is the chilling-box, made of earthenware, or other equivalent material, such as clay ware, as is found in drain-tiles and flower-pots, and is made unglazed, so as to be porous in all its parts.

E is the cover, also made of earthenware, and unglazed, so as to be porous. Made in the said cover is the perforation (one or more) $s$.

F F is a piece of fabric, or other bibulous substance, which covers over the several sides (outer) and the top of the chilling-box. The lower margin edges of this bibulous substance enters into the trough $c$, and is held in place in the same by the lower or base edge of the chilling-box resting on the same in the said trough.

The manner in which the several parts of this apparatus operates is as follows: The substance to be chilled and preserved cold is placed within the chilling-box, resting on the grated floor $b$, or supported at a short distance above the same—say for one or two inches—by any suitable support. Water is then introduced into the trough $c$ through the conduit $d$ from the funnel $e$. The chilling-box is then covered over by cover E, and the fabric F is then adjusted properly to envelop the whole outer surface of the said chilling-box.

The water in the trough $c$ is gradually and continuously drawn from the same by the bibulous envelope F, and evaporated on the outer-side surface of the porous chilling-box, through which the water will percolate. A part of the water will return to the trough, and another part will be evaporated and render latent the heat abstracted from the chilling-box. This apparatus should be placed near to the floor, at a distance of only a few inches therefrom.

A circulation of air, to a small degree, is had through the chilling-chamber, through the perforated section in the bottom of the case of the apparatus, and the opening $s$ in the cover of the chilling-box.

I am aware that chilling substances inclosed within a porous box or jar by wetting its outer surface is an old and well-known process. I therefore do not broadly claim the use of such porous box, or the covering of the same with a bibulous substance, as that also is old.

What I claim, and desire to secure by Letters Patent, is—

1. In combination with the trough $c$ and cover E, the detachable sections constituting the sides of box D, said side sections and cover being lined externally with a bibulous envelope, F. extending to the bottom of said side pieces.

2. In combination with external shell B C, perforated bottom A, grating $b$, and trough $c$, the cover E and detachable side sections forming the sides of the chilling-box, said sections and cover being lined externally with bibulous material F, extending to the bottom of said side pieces.

THOS. ELKINS.

Witnesses:
CHARLES SELKIRK,
ALEX. SELKIRK.